United States Patent [19]

Kaczmarczyk et al.

[11] Patent Number: 4,798,511
[45] Date of Patent: Jan. 17, 1989

[54] METHOD AND APPARATUS FOR ATTACHING A LOADER TO A TRACTOR

[75] Inventors: Edward T. Kaczmarczyk, Welland; Rory Rae, Port Colborne; Roger A. Noyes, Niagara Falls, all of Canada

[73] Assignee: Deere & Company, Moline, Ill.

[21] Appl. No.: 946,221

[22] Filed: Dec. 23, 1986

[51] Int. Cl.⁴ .............................................. E02F 3/627
[52] U.S. Cl. ...................................... 414/686; 248/52; 403/317; 414/786; 414/918
[58] Field of Search ................ 414/685, 686, 786, 918; 403/316, 317; 248/51, 52

[56] References Cited

U.S. PATENT DOCUMENTS

| | | | |
|---|---|---|---|
| 2,903,145 | 9/1959 | Brinkel | 214/138 |
| 3,220,579 | 11/1965 | Pilch | 214/138 |
| 3,460,690 | 8/1969 | Seifert | 414/686 |
| 3,610,450 | 10/1971 | Demkiw | 214/140 |
| 3,805,980 | 4/1974 | Kisaka | 214/214 |
| 3,912,095 | 10/1975 | Miller | 214/172 |
| 3,939,997 | 2/1976 | Frank | 214/131 A |
| 3,982,643 | 9/1976 | MacGregor et al. | 214/131 A |
| 3,991,890 | 11/1976 | Frank | 214/131 A |
| 4,033,469 | 7/1977 | Frank | 214/131 A |
| 4,051,962 | 10/1977 | Westendorf | 214/131 A |
| 4,217,075 | 8/1980 | Frank | 414/686 |
| 4,247,242 | 1/1981 | Goertzen | 414/686 |
| 4,266,909 | 5/1981 | Langenfeld et al. | 414/700 |
| 4,384,619 | 5/1983 | Schuck | 414/918 X |
| 4,529,352 | 7/1985 | Suzuki et al. | 414/918 X |

FOREIGN PATENT DOCUMENTS

| | | |
|---|---|---|
| 3100845A1 | 4/1983 | Denmark . |
| 3151279A1 | 7/1983 | Denmark . |
| 2477362 | 9/1981 | France . |
| 2571452 | 4/1986 | France . |
| 0581085 | 11/1977 | U.S.S.R. ............................ 414/918 |
| 859309 | 1/1961 | United Kingdom . |
| 2131391A | 6/1984 | United Kingdom . |
| 2133379A | 7/1984 | United Kingdom . |

OTHER PUBLICATIONS

"Loaders, Spreaders, Blades and Snow Blowers", John Deere brochure, undated.

Primary Examiner—Robert J. Spar
Assistant Examiner—Donald W. Underwood

[57] ABSTRACT

A method and apparatus for quickly mounting a loader on a tractor which eliminates need for loose connecting pins or bolts and tools. A pair of slotted brackets include sliding wedge blocks which automatically secure the mast post pins in position during mounting. The mast post pins are moved into the slots, and then the forward portion of the loader frame is rotated upwardly about the axis of the pins to engage forward mounting structure. The tractor is then driven forward to slide the mast post pins into the respective slotted brackets. Thereafter, the boom cylinders are actuated to rock the loader frame about the forward mounting structure and move the mast post pins into vertically disposed portions of the slots and to permit the wedge blocks to slide into their latching positions. A handle operated cam arrangement moves the block away from the slot portion for dismounting the loader. The slots are angled to help break the loader frame away from the brackets during dismounting without requiring excessive load drag. Pivoting hose support structure and a forwardly projecting hose bracket assembly minimize hydraulic hose length and reduce hose routing problems both during loading and mounting/dismounting operations.

29 Claims, 8 Drawing Sheets

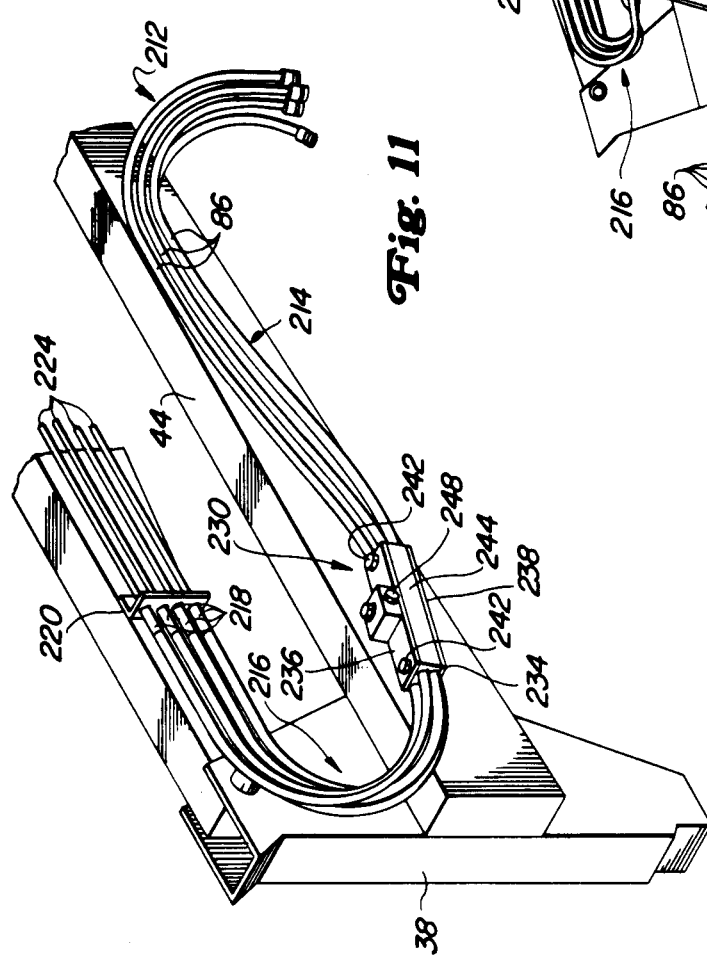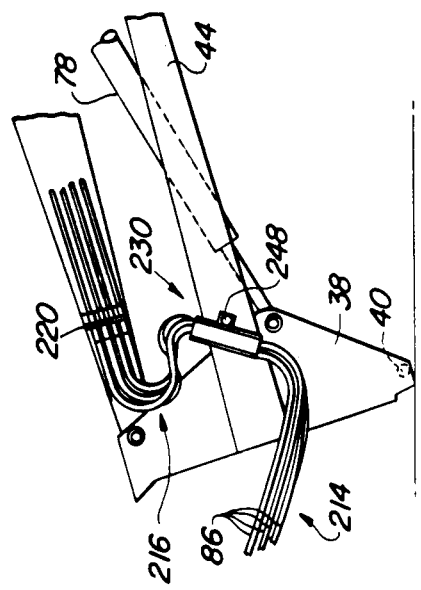

METHOD AND APPARATUS FOR ATTACHING A LOADER TO A TRACTOR

BACKGROUND OF THE INVENTION

The present invention relates generally to loaders which are adapted for mounting on a frame of a tractor, and more specifically to a system for quickly and easily attaching the loader to the tractor and for removing the loader from the tractor, without requiring special tools or loose parts such as pins or bolts.

Previously available loaders are generally attached to a tractor utilizing special brackets with mounting pins or bolts which easily become lost and which require tools to secure the mast to the frame. Numerous steps are often required by the operator for attaching or detaching the loader mast, and therefore such operations are inconvenient and time-consuming. With some loaders, parking stands are utilized to support the loader in the parked position, and these have to be readjusted or removed when the loader is attached. Mismatch between the loader and tractor, in some instances as little as a fraction of an inch, can greatly hinder parking and mounting operations. Connecting members with close tolerances, or in the alternative, special adjusting hardware, often are used to prevent unwanted play between the tractor frame and the mast assembly, and in many loaders wherein primary connections are made at the front of the tractor the tolerances are even more critical. Such structure increases the cost and complexity of the loader. With some mounting arrangements, large frames are required on the tractor which interfere with normal tractor operation when the loader is dismounted.

Many of the previously available loader structures are difficult to break loose from the tractor frame during dismounting. Often, the frames mounted on the tractors are covered with grease to reduce binding. Successful removal of the structure often relies upon loader drag to break the loader free from the mounting frame. In difficult situations such as when the loader has been mounted on the tractor for a long period of time, additional equipment may be necessary to physically hold the loader bucket against the ground to provide the necessary loader drag during dismounting.

Long hydraulic hoses, or extension hoses, are often required to maintain hydraulic connection of the loader with the tractor during dismounting. With some structures, the operator has to handle the hoses while moving the tractor during mounting and dismounting. When the loader is mounted on the tractor, the longer hoses are often difficult to mount and maintain out of interfering relationship with the boom and frame during normal operation of the loader.

Some loaders rely on hydraulic pressure to maintain the loader in the parked position, and therefore cylinder and hose leakage create problems during storage. Also, when cylinders remain partially extended in the parked position, the rods are subjected to damage during storage.

BRIEF SUMMARY OF THE INVENTION

It is therefore an object of the present invention to provide an improved method and apparatus for mounting and dismounting an implement such as a loader with respect to a tractor. It is a further object to provide such a method and apparatus which obviate the need for loose parts and tools and for manual adjustments to compensate for manufacturing tolerances and wear, and which eliminate large frames which must be left on the tractor. It is another object to provide such a method and apparatus which reduce the number of trips on and off the tractor the operator must make to park and attach the loader.

It is still a further object of the present invention to provide an improved method for mounting a loader or similar implement on a tractor which advantageously utilizes the loader cylinders to rotate the loader frame in turn about multiple pivot points to quickly and easily mount and dismount the loader without requiring the loader frame to be dragged over mounting structure and without requiring excessive loader drag.

It is another object of the invention to provide an improved method and apparatus for mounting and dismounting an implement such as a loader with respect to a tractor wherein the loader does not have to be dragged across frames and wherein parking of the loader is done primarily by hydraulic means and does not depend upon loader drag. It is still another object to provide such a method and apparatus which facilitates safe parking of the loader in most any ground condition and wherein all cylinders on the loader are fully closed when parked to prevent cylinder damage and eliminate need to rely on cylinder pressure for proper storage position. It is still another object to provide such a method and apparatus which reduce the manufacturing tolerances required in the mounting bracket structure to securely mount the loader and which increase the amount of positional mismatch which can be tolerated between tractor and loader without hindering mounting or dismounting operations.

It is still another object of the present invention to provide an improved method and apparatus for attaching a loader or similar implement to a tractor which eliminate binding of the loader and which require very little driver skill.

It is another object of the present invention to provide an improved mounting bracket structure for mounting an implement such as a loader on the frame of a tractor. It is a further object to provide such a bracket which is simple in construction, reduces manufacturing tolerances, is compact and does not require additional pins or bolts to make the final connection of the loader with the tractor. It is yet another object to provide such a bracket which eliminates binding and permits the loader to break away from the tractor without relying on drag load of the loader against the ground or use of heavy tools such as hammers and the like. It is another object to provide such a bracket which automatically secures the loader in position.

It is still another object of the present invention to provide structure for conveniently and compactly supporting and routing hydraulic hoses of a dismountable loader both when the loader is attached to a tractor and when the loader is being dismounted from the tractor. It is a further object to provide such structure which eliminates need for long hoses or extension hoses for use during parking, and which requires shorter hoses for use at the boom and mast of a loader. It is still another object to provide such structure which eliminates need for the operator to handle hoses while parking the loader.

In accordance with the present invention, there is provided a loader having special rear mounting brackets connected to the frame of the tractor. The brackets each have a spring loaded wedge mounted adjacent a two-part slot which receives a pin fixed to the lower end of the mast post. With each pin supported level with the corresponding bracket, the tractor is driven forwardly and the pin is guided into the first portion of the slot. The boom cylinders are then actuated to transfer the weight of the loader from the ground to the tractor. In one embodiment of the invention, the front portion of the loader frame includes a forward mounting structure with a hooked slot adapted for engaging a pin at the forward end of the tractor frame. After the mast post pins engage the bracket slots, the boom cylinders are actuated to rotate the forward end of the loader frame about the mast pins until the slotted hooks engage the bottoms of the forward pins. The tractor is then driven forwardly until the forward pins bottom in the front slots. At the same time the mast post pins move to the ends of the first portions of the bracket slots. This movement also pushes a wedge block rearwardly along each of the slots. A second portion of the rear bracket slot extends upwardly from the first portion. The boom cylinders are extended to rotate the loader frame about the forward mounting structure and to push each mast post pin up into the second portion of the slot at which time the wedge is biased under the pin to automatically secure the pin in position in the bracket. The wedge also takes up any play between the mast post and the mounting bracket and automatically compensates for any looseness which would otherwise develop as a result of wear, corrosion and the like.

To dismount the loader, the front end of the loader is raised to remove any loading on each of the wedges and a handle operated cam is utilized to push the wedge from under the mast post pin. Thereafter the loader cylinder is retracted to rest the bucket on the ground and shift the weight to the loader mast causing the mast pin to drop down along the second portion of the bracket slot. The bracket slot is angled downwardly and forwardly to move the entire loader frame forwardly thereby breaking the loader loose from the tractor as the pin moves downwardly in the slot. The tractor is then backed up until the front pin on the tractor hits the rear hook portion of the slotted hook. The first portion of each bracket slot is angled slightly downwardly in the forward direction to help the pin slide in the slot during dismounting. The lift cylinders are extended permitting the forward end of the frame to rotate away from the front mounting pin. Continued extension of the lift cylinders causes the loader frame to touch the ground and shift the weight of the loader to the ground. The tractor is then backed up until the mast of the loader clears the front of the tractor.

The hydraulic hoses are supported by a pivoting hose support bracket located adjacent the mast post to take up slack in the hoses and permit the hoses to flex during operation of the loader. During mounting and dismounting of the loader the hose support structure rotates approximately 180 degrees and eliminates need for extension hoses or extra long hydraulic hoses and maintains the hoses out of interfering relationship with the equipment. Front hose couplers are provided to facilitate removal and attachment of the loader with respect to the tractor and to facilitate hose routing. Once the loader is sitting on the ground in the parked position the hydraulic pressure can be completely relieved and hoses disconnected. In the parked position, the cylinders are completely retracted to protect the cylinder rods. The mounting frame left on the tractor when the loader is removed is relatively compact and has a minimum number of parts. No loose parts such as pins or bolts are required to mount and dismount the loader, and no tools are required. The wedge and the frame bracket always remain tight and never require adjustment, and during mounting the bracket automatically secures the mast post to the tractor frame without requiring the operator to leave his seat. Mounting and dismounting of the loader is relatively easy, fast and reliable, and does not rely upon portions of the loader having to be dragged across the frame. Parking is done hydraulically and does not depend on loader drag.

These and other objects, features and advantages of the present invention will become apparent to those skilled in the art from the description which follows and from the drawings.

BRIEF DESCRIPTION OF THE DRAWINGS

FIG. 11 is a side perspective view of the inside portion of the aft end of the mast and boom structure with the hoses attached thereto by a hose bracket.

FIG. 12 is a side view of the structure of FIG. 11 and showing the hose bracket rotated to facilitate connection of the hoses to the tractor when the loader is in the parked condition.

DESCRIPTION OF THE PREFERRED EMBODIMENT

Figure 1:
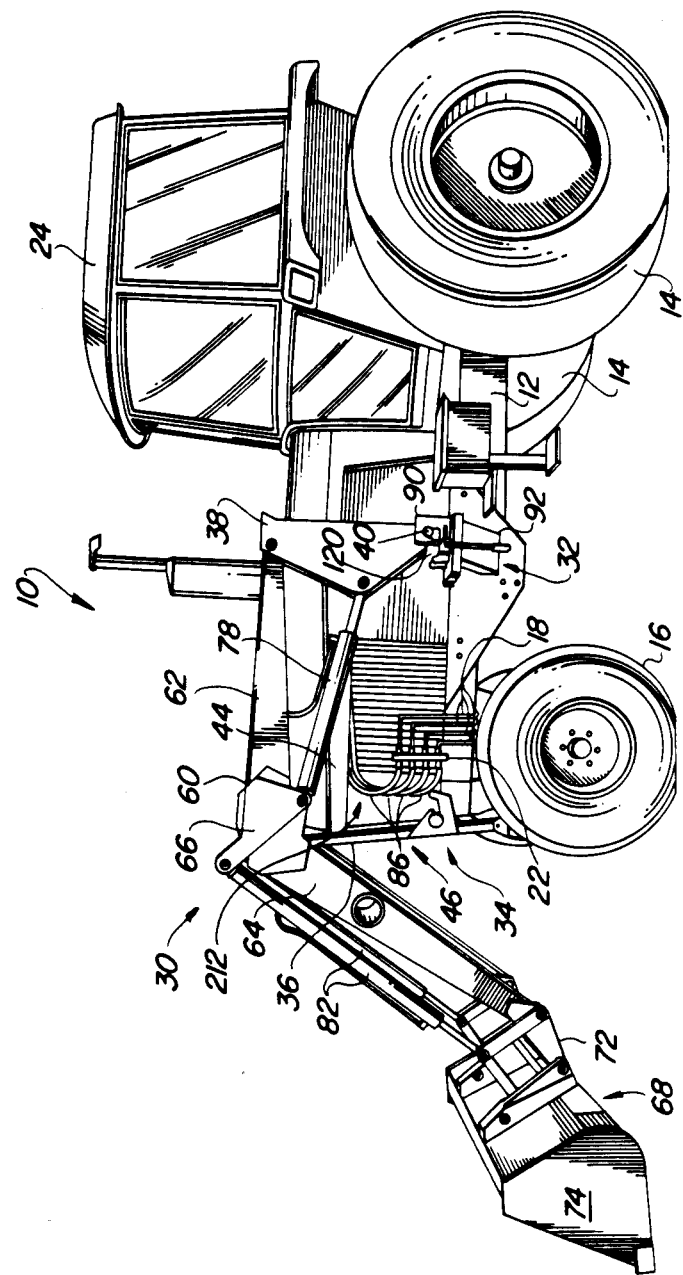
FIG. 1 is a side perspective view of a tractor with a loader attached thereto.

Referring now to FIG. 1, there is shown a tractor 10 having a main frame 12 supported for forward movement over the ground by rear drive wheels 14 and front steerable wheels 16. A plurality of forwardly projecting hydraulic lines 18 are connected to the forward end of the main frame 12 by a support bracket assembly 22. The hydraulic lines 18 are connected to a source of hydraulic fluid on the tractor through conventional hydraulic controls (not shown) in the cab 24 of the tractor 10.

A front end loader 30 is connected to the main frame 12 of the tractor 10 by transversely spaced rear mounting bracket structure 32 and forward connecting structure 34. The loader 30 includes a loader frame indicated generally at 36 having a pair of transversely spaced upright rear mast posts 38, each having lower end with a transversely projecting mounting pin 40 adapted for receipt by the corresponding rear mounting bracket structure 32. Left- and right-hand mast beams 44 include aft ends fixed to the central portion of the mast posts 38. The forward ends of the mast beams 44 are connected to a transversely extending connecting weldment 48 (FIG. 2) which includes upright posts 52 connected to the respective mast beams 44 and a tie bar 54 extending between the posts 48 adjacent the connecting structure 34. Similar transversely extending tie bars are connected between the posts 52 generally between the forward ends of the mast beams 44 and between the upper ends of the posts 52.

Figure 13:
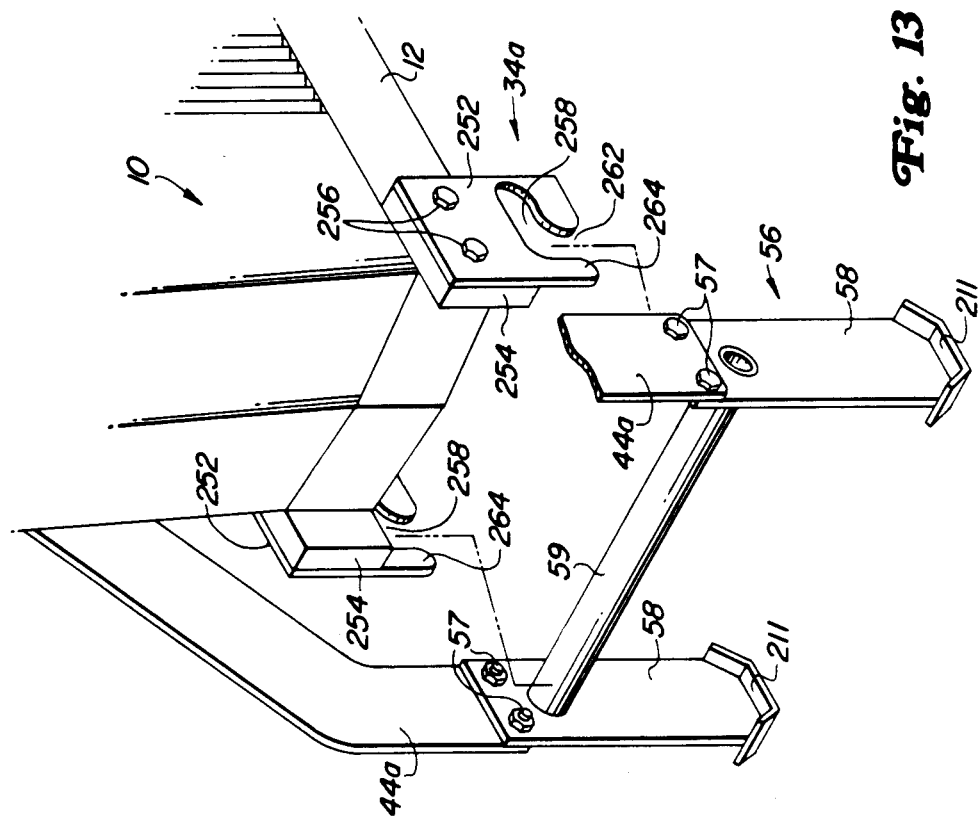
FIG. 13 is a view similar to FIG. 10 but showing an alternate embodiment of the front portion of the loader frame and front mounting structure.

In the alternate embodiment of FIG. 13, the mast beams 44 include downwardly and forwardly projecting extensions 44a connected to an assembly 56 by bolts 57. The assembly 56 includes upright legs 58 connected by a crossbar pivot 59 forming a portion of forward connecting structure designated generally at 34a and described in detail below.

The loader 30 also includes boom structure indicated at 60 having a first generally horizontally extending boom section 62 with an aft end pivotally connected to the upper end of the mast post 38. A second boom section 64 is connected to the forward end of the first boom section 60 by plate structure 66 and extends downwardly therefrom to a forward lower end connected to bucket structure 68 by linkages 72. As shown, the bucket structure 68 includes a conventional loader bucket 74, but it is to be understood that the present invention may be utilized with other implements.

A pair of boom cylinders 78 each includes a cylinder end pivotally connected to the corresponding plate structure 66 and a rod end connected to the central portion of the corresponding mast post 38. A pair of bucket cylinders 82 are connected between the upper ends of the connecting plate 66 and the linkages 72. The boom and bucket cylinders 78 and 82 are connected through hydraulic lines 86 to the hydraulic lines 18 at the support bracket assembly 22. The boom 60 may be pivoted upwardly and downwardly about its pivotal connections with the upper ends of the mast 38 by extending and retracting the cylinders 78. Control of the bucket structure 68 is achieved through operation of the cylinders 82. The rear mounting bracket structure 32 and the forward connecting structure 34 or 34a permit the loader 30 to be mounted on or dismounted from the tractor without requiring loose bolts, pins or tools by operating the cylinders 78 and moving the tractor 10 relative to the loader frame 36 as will be described in detail below.

REAR MOUNTING BRACKET STRUCTURE

Figure 8:
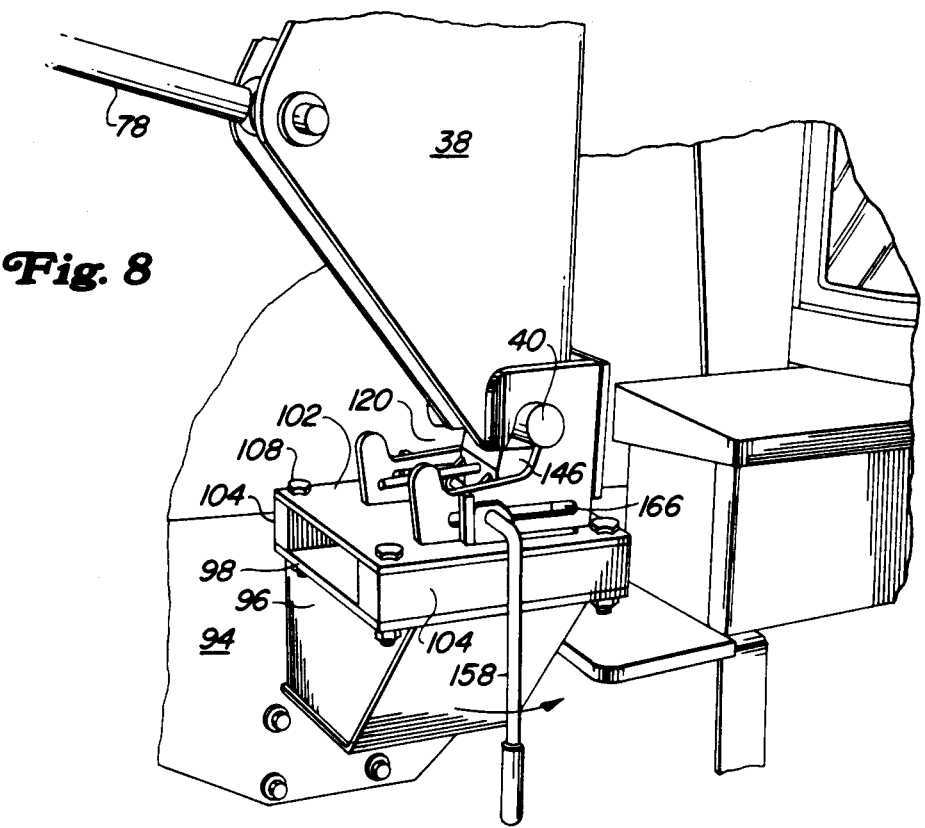
FIG. 8 is a side perspective view of the mounting bracket showing the pin in the second portion of the slot with the wedge in its latched position.

For a more detailed description of the rear mounting bracket structure 32, reference is now made to FIGS. 6–9. The right-hand mounting structure 32 is substantially the mirror image of the left-hand structure 32, and therefore only the left-hand structure will be described in detail. Forwardly opening slotted bracket structure 90 is supported forwardly of the cab 24 adjacent the tractor frame 12 by a tractor loader frame 92. As shown in FIG. 8 the loader frame 92 includes a side mounting plate 94 bolted to the side of the main frame 12 and supporting an outwardly extending box frame 96 having a horizontally extending plate 98 connected thereto. A second horizontally disposed plate 102 is offset above the first plate 98 by a series of spacers 104. Bolts 108 extend through the corners of the plates 102 and 98 and through the spacers 104 to secure the second plate to the box frame 96.

The slotted bracket structure 90 includes a pair of upright plate members 112 supported on the second plate 102 in transversely spaced relationship. A rear connecting plate 114 is welded between the aft edges of the plate members 112 to define a forwardly opening, U-shaped pocket indicated generally at 116. Slots 120 are formed in the members 112. The forward portion of each slot 120 is generally horizontal but has a slight downward component in the forward direction and opens upwardly at 122 adjacent the forward portion of the plate member 112. The aft or second portion of the slot 120, indicated generally at 126, has a substantial vertical component and is angled upwardly in the rearward direction to define a pocket above the first portion of the slot. The upper, forward portion of each side plate member 112 is bent outwardly at 130 to help channel the mast post 38 into and center the post with respect to the bracket structure 90 during mounting of the loader 30 on the tractor 10. Upward projections 132 at the lower, forward end of the plate members 112 define a stop member for limiting the forward sliding of the pin 40 during dismounting of the loader and for directing the pin 40 into the slot 120 during mounting.

Figure 9:
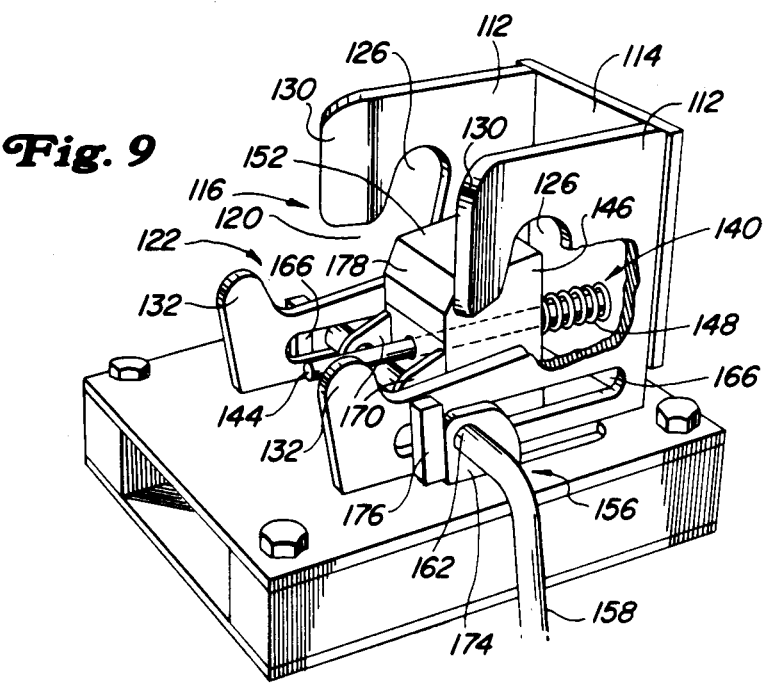
FIG. 9 is an enlarged view of the mounting bracket with parts broken away to more clearly show the mechanism.

A sliding wedge block arrangement 140 is provided for automatically securing the mast 38 in position as the mast pin 40 moves upwardly in the upper portion 126 of the slot 120, and for preventing play between the mast post and the mounting bracket structure 32. The wedge block arrangement 140 includes a horizontally disposed pin 144 projecting forwardly from the rear plate 114 and slidably mounting a block 146. A coil spring 148 encircles the aft end of the pin 144 and is compressed between the rear plate 114 and the aft face of the block 146 to yieldingly bias the block forwardly to a pin-retaining position as shown in FIGS. 8 and 9. When the pin 40 is in the pocket or second portion 126 of the slot 120, the block 146, which includes a generally flat upper surface 152 which is sloped upwardly in the rearward direction, supports the bottom of the pin 40 and prevents the pin from sliding downwardly in the slots 126. Since the spring 148 biases the block 146 forwardly, the inclined upper surface 152 automatically takes up any play between the pin 40 and the bracket.

To release the pin 40 during dismounting of the loader 30 from the tractor 10, a sliding cam operated handle arrangement indicated generally at 156 is provided. The handle arrangement 156 includes a handle 158 which has a transverse shaft portion 162 extending through a pair of fore-and-aft extending slots 166 located at the bottom of the plates 112. The shaft portion 162 is pivotally connected to the forward portion of the wedge block 146 by a pair of forwardly projecting ears 170 connected to the forward face of the block. A pair of cams 174 is fixed to the shaft 162 on either side of the plate members 112 and bear against a pair of contact members 176 secured to the opposite sides of the plate members 112 at the forward ends of the slots 166. Slots 177 are provided in the plate 102 to accommodate rotation of the cam 174. With the handle 158 in the down position, the wedge block 146 is free to slide to its forwardmost locking position as shown in FIG. 9. To move the block 146 rearwardly and release the pin 40 from the upper portions 126 of the slot 120, the handle 158 is rotated in the counterclockwise direction to urge the cams 174 against the respective contact members 176 to thereby move the shaft portion 162 with the wedge block 146 rearwardly in the slots 166 to a release position wherein the upper surface 152 is offset rearwardly from the rear portion of the slot portion 126. The upper forward portion of the block 146 includes an angled portion 178 which generally conforms to the rear of the slot portions 126 when the block is in the release position to facilitate movement of the pin 40 into and out of the portion 126.

During mounting of the loader on the tractor, the handle is positioned as shown in FIG. 9 to permit the wedge block 146 to slide forwardly to the securing position. The pin 40 then is positioned adjacent the slot 120 and the tractor is moved forwardly relative to the mast post 38. The pin 40 moves the wedge block 146 rearwardly as the pin 40 moves rearwardly and slightly upwardly in the forward portion of the slot 120. When the pin 40 is located below the portion 126 of the slot 120, the mast 38 is raised relative to the tractor frame 12 so that the ends of the pin 40 move upwardly into the portion 126. Once the ends of the pin 40 have moved into the slot portions 126, the wedge block 146, operating under the influence of the bias of the spring 148, slides forwardly under the bottom of the pin 40 to secure the pin in the slot portions 126 and thus lock the mast 38 against fore-and-aft and vertical movement with respect to the bracket 90. The pin 40 therefore is secured within the bracket structure 90 automatically without need for the operator to leave his tractor seat and without need for additional mounting pins or bolts. Manufacturing tolerances may be increased while still providing a good fit between the pin 40 and the bracket 90 since the wedge block 146 automatically takes up any play between the members. When the wedge block 146 is moved to the release position away from under the pin 40, the slight forward incline of the slot portion 126 in the downward direction helps to break the loader 30 away from the tractor as the pin 40 moves downwardly in the slot portion 126. Once the pin 40 moves downwardly into the forward portion of the slot 120, the tractor may be moved rearwardly with respect to the loader to cause forward movement of the pin 40 relative to the slot 120 until the pin 40 reaches the forwardmost portion of the slot and stops against the upward projections 132. Thereafter, the boom cylinder 78 may be operated to lift the pin 40 upwardly at 122 clear of the bracket 90.

FORWARD CONNECTING STRUCTURE

Figure 4:
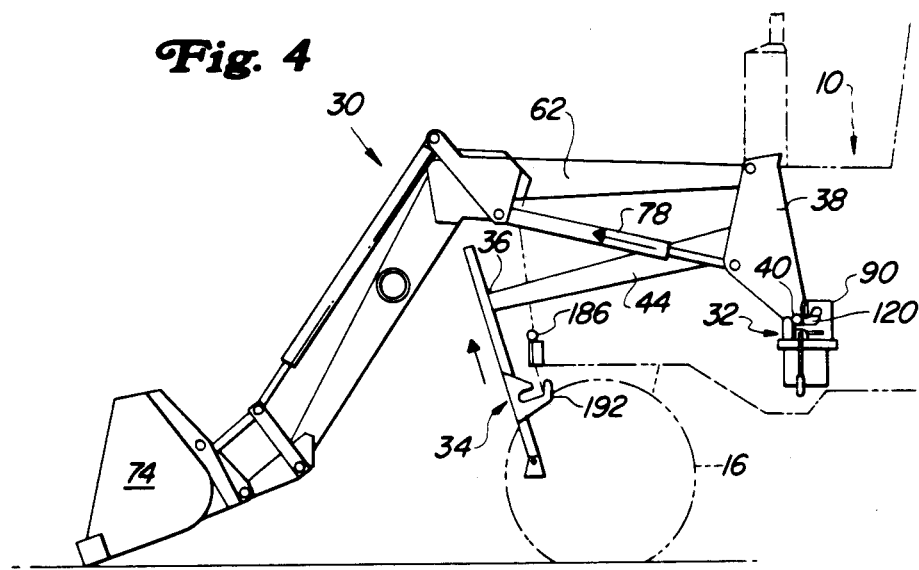
FIG. 4 is a view similar to FIG. 3 but showing the boom cylinder retracted to raise the forward end of the mast beams.
Figure 10:
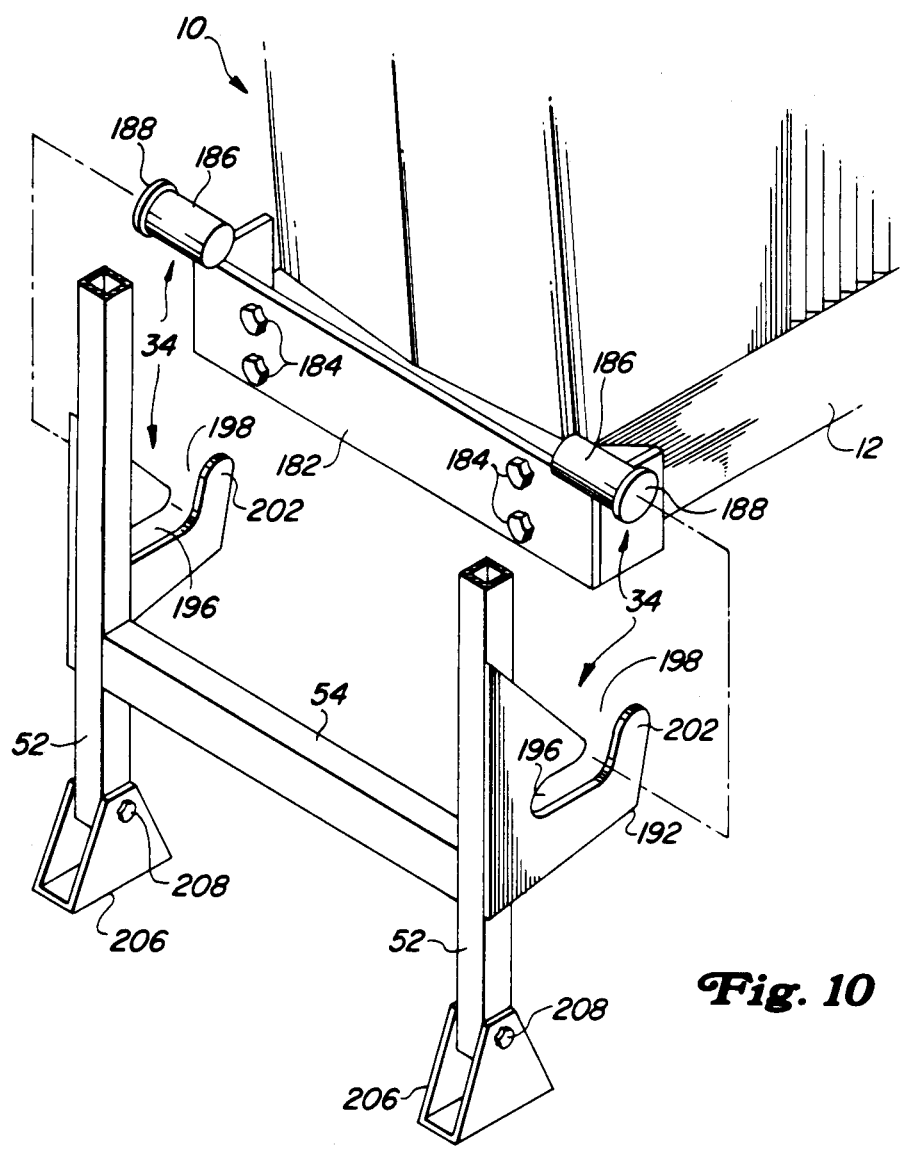
FIG. 10 is an enlarged front perspective view of a portion of the tractor frame and the corresponding front portion of one embodiment of the loader frame.

For a more detailed description of the forward connecting structure 34, reference is made to FIG. 10. A front mounting frame 182 is connected to the forward portion of the tractor main frame 12 by bolts 184. The frame 182 supports a pair of outwardly projecting mounting pins 186 having enlarged outermost end portions 188. Mating slotted brackets 192 are connected to the outermost faces of the upright posts 52 adjacent the tie bar 54 and include horizontally disposed slots 196 opening upwardly and rearwardly in an area indicated generally at 198 just forwardly of rearward upwardly projecting members 202. The slotted brackets 192 define generally hooked-shaped members which are adapted to be captured by the corresponding pins 186 as the mast beams 44 are rotated upwardly during mounting of the loader (FIG. 4).

In the alternate embodiment of FIG. 13, the forward connecting structure 34a includes slotted brackets 252 spaced outwardly from each side of the front of the tractor frame 12 by spacers 254 and attached by bolts 256. Fore-and-aft extending slots 258 open downwardly at their forward ends generally at 262. The brackets 252 include downwardly projecting members or ears 264.

Figure 5:
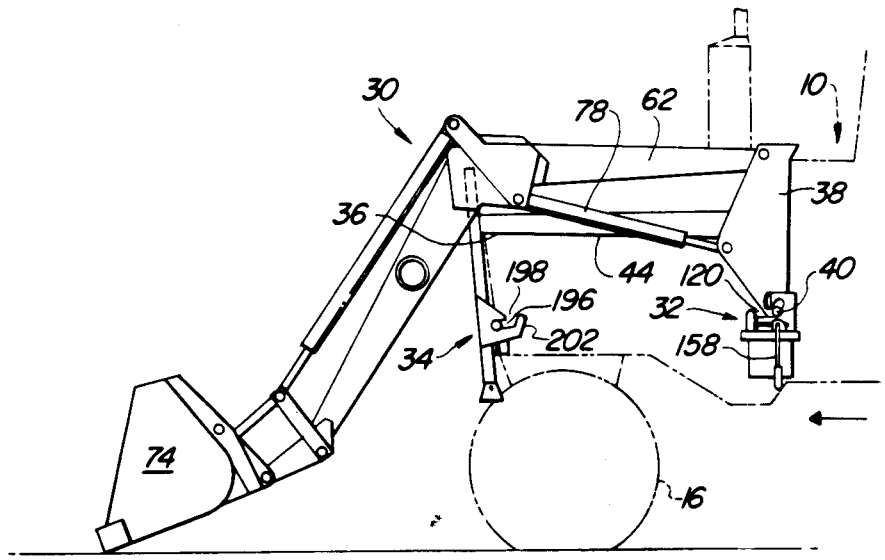
FIG. 5 is a view similar to FIG. 4 but showing the front portion of the loader mast in its fully raised position and the tractor moved forwardly to move the mast pins rearwardly in the corresponding bracket slots.
Figure 6:
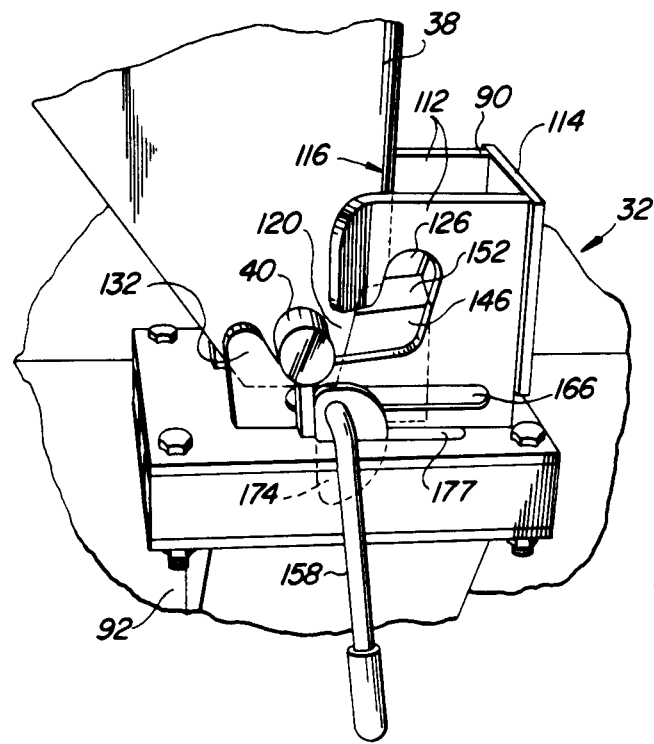
FIG. 6 is an enlarged view of the mounting bracket with the mounting pin engaging the forward portion of the slot.
Figure 7:
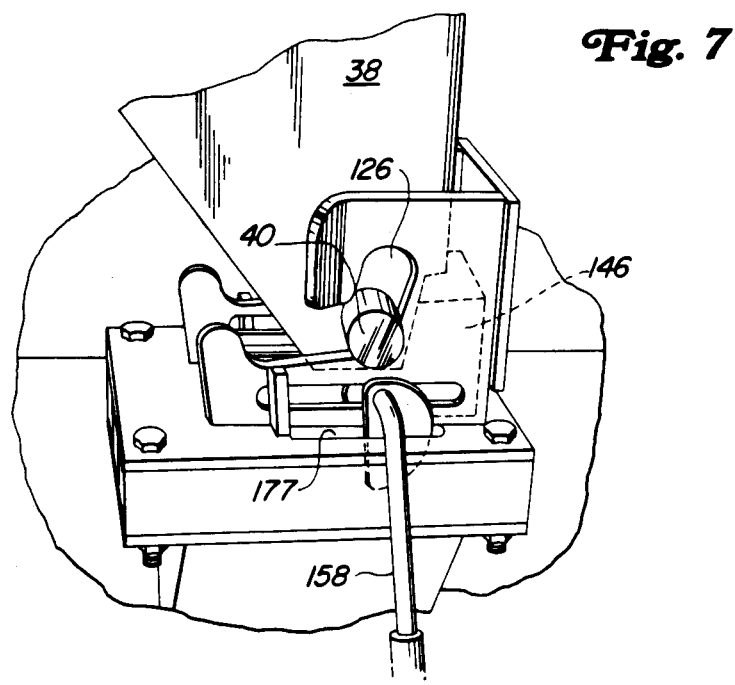
FIG. 7 is a view similar to FIG. 6 but showing the mounting pin moved rearwardly toward the second portion of the slot and the wedge moved rearwardly by the pin.

Preferably, the mast pins 40 are first positioned in the slotted bracket structure 90 (FIG. 4) and thereafter the boom cylinders 78 are extended to rotate the loader frame upwardly about the pins 40 until the front mounting pins 186 engage the lower portion of the slot 196 adjacent the projections 202. Thereafter, the tractor pin is moved forwardly with respect to the loader frame to cause the pins 186 to move forwardly in the slots 196 to prevent vertical movement of the front portion of the loader frame 36 with respect to the forward portion of the tractor frame 12. At the same time the mounting pin 40 moves rearwardly in the slots 120 of the slotted bracket structure 90 (FIG. 5). Thereafter, the cylinder 78 is extended to move the pin 40 upwardly into the slot portions 126. Once the wedge block 146 moves under the pin 40, the entire loader is firmly secured to the tractor frame 12.

In the alternate embodiment of FIG. 13, the front of the loader 30 is rotated upwardly until the crossbar pivot 59, which acts as the mating pin structure, enters the openings at 262 of the brackets 252 and contacts the top of the slots 258. The tractor 10 is then driven forwardly so that the crossbar pivot 59 seats in the back of the slots 258.

Figure 14:
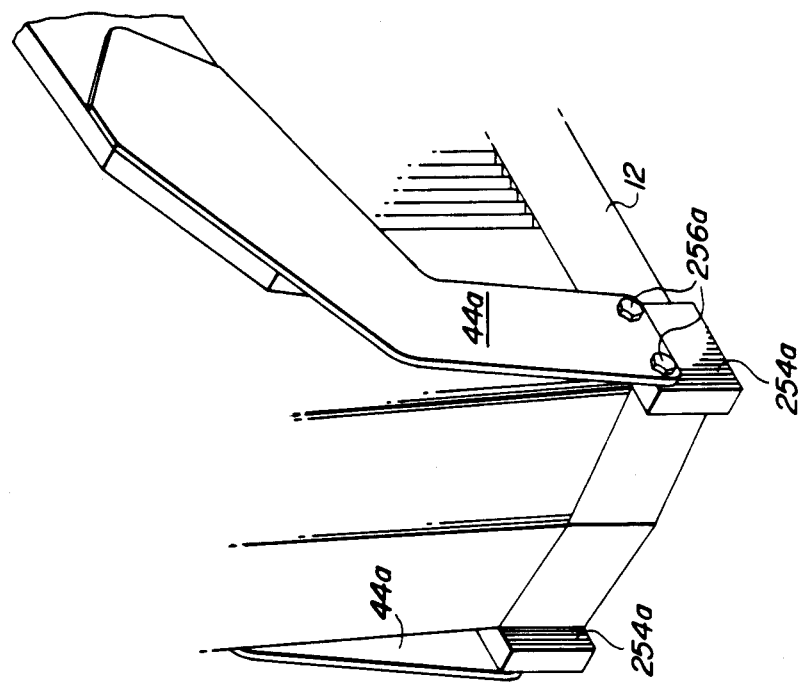
FIG. 14 is a view similar to FIG. 13 but showing an alternate front mounting structure utilized when the parking features of the present invention are not required.

To facilitate parking of the loader, the upright posts 52 of the connecting weldment 48 (FIG. 10) extend downwardly a short distance below the slotted mounting brackets 192. Foot members 206 are pivotally connected by bolts 208 to the bottom of the posts 52. In the parked position of the loader (FIG. 2), the foot members 206 rest on the ground with the posts being generally vertical but with a slight rearward tilt. The cylinder 78 and 82 are in their retracted positions and the masts 38 rest on the ground. In the embodiment of FIG. 13, the legs 58 of the assembly 56 extend downwardly from the crossbar pivot 59 to fixed foot portions 211 which rest on the ground during storage. If the loader 30 is to be permanently mounted on a vehicle, the assembly 56 is eliminated (FIG. 14) and the lower front portions of the mast beam extensions 44a are secured directly to spacers 254a by bolts 256a.

HYDRAULIC HOSE STRUCTURE

To facilitate loader mounting and dismounting and to provide advantageous hydraulic hose routing with a minimum of hose length, a hydraulic system as best seen in FIGS. 1, 11 and 12 is utilized. Forwardly directed quick couplers are located on the support bracket assembly 22 at the forward ends of the hydraulic lines 18. The lines 18 are connected to conventional hydraulic ports (not shown) at the rear of the tractor. The flexible hoses 86 are connected to the quick couplers on the bracket 22, and when the loader is mounted as shown in FIG. 1, the hoses 86 are bent rearwardly at location 212 and include a central portion 214 (FIG. 11) which extends generally parallel to the mast 44. At the aft end of the mast 44, the flexible hoses 86 are curved upwardly and forwardly adjacent the pivotal connection of the first boom section 62 with the mast 38. The hoses include output ends 218 supported by an upright bracket 220 on the boom section 62 forwardly of the pivotal connection. Rigid lines 224 are connected to the output ends 218 at the bracket 220 and extend forwardly therefrom along the boom section 62 to various locations on the boom 60 for connection to the cylinders 78 and 82. Hose support structure indicated generally at 230 is pivotally connected to the aft end of the mast beam 44 for supporting the hoses 86 and permitting the hoses to flex with pivoting of the boom and with fore-and-aft movement of the tractor with respect to the loader frame during mounting and dismounting of the loader. The support structure 230 includes a mounting bracket 234, preferably fabricated from durable plastic material, with upper and lower plates 236 and 238 connected by bolts 242 to sandwich the hoses 86 between the plates. Side members 244 extend between the plates to secure the hoses 86 within the bracket 234. A pivot block 246 extends upwardly from the upper plate 236 and is rockably connected to a transversely extending pivot pin 248 which is fixed to the inside of the mast beam 44. The bracket 234 is therefore freely rockable about the axis of the pin 248 closely adjacent the inside surface of the mast beam 44. The hoses 86, therefore, can rock up and down with pivoting of the boom section 62. As the boom 62 is rocked upwardly, the bracket 234 rocks in the clockwise direction (FIG. 11), and as the boom section 62 is lowered, the bracket can again assume the position shown in FIG. 11. When the tractor 10 is being backed from the loader 30 during dismounting, the bracket 234 rotates in the clockwise direction (FIG. 12) up to approximately 180 degrees so that the central portion 214 of the hoses 86 extends rearwardly to facilitate dismounting with the hoses 86 still attached to the couplers on the bracket 22 at the forward end of the tractor 10. The forwardly projecting connectors at the bracket 22 increase the distance the tractor 10 may be backed from the loader 30 with the hoses 86 connected and also permit the hoses 86 to be reconnected with the tractor space farther away from the loader during mounting. Once the hoses 86 are connected during mounting of the loader, the tractor 10 may be driven forwardly at which time the bracket 234 will rotate in the counterclockwise direction from the position shown in FIG. 12 toward the position shown in FIG. 11. The above-described hydraulic structure minimizes hose length while optimizing hose routing to reduce the possibility of hose kinking and hose damage during both mounting and dismounting of the loader and while the boom 60 is being raised and lowered during normal operation of the loader.

MOUNTING OF THE LOADER

Figure 2:
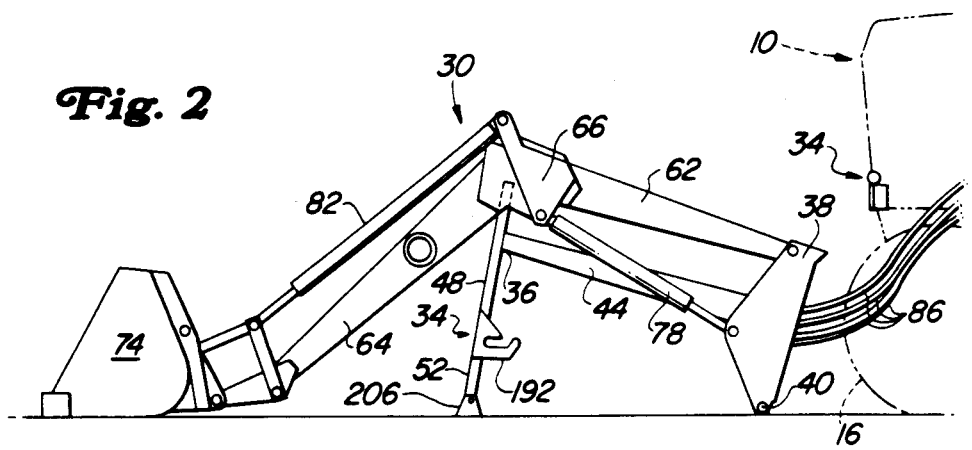
FIG. 2 is a side view showing the loader in the parked position.
Figure 3:
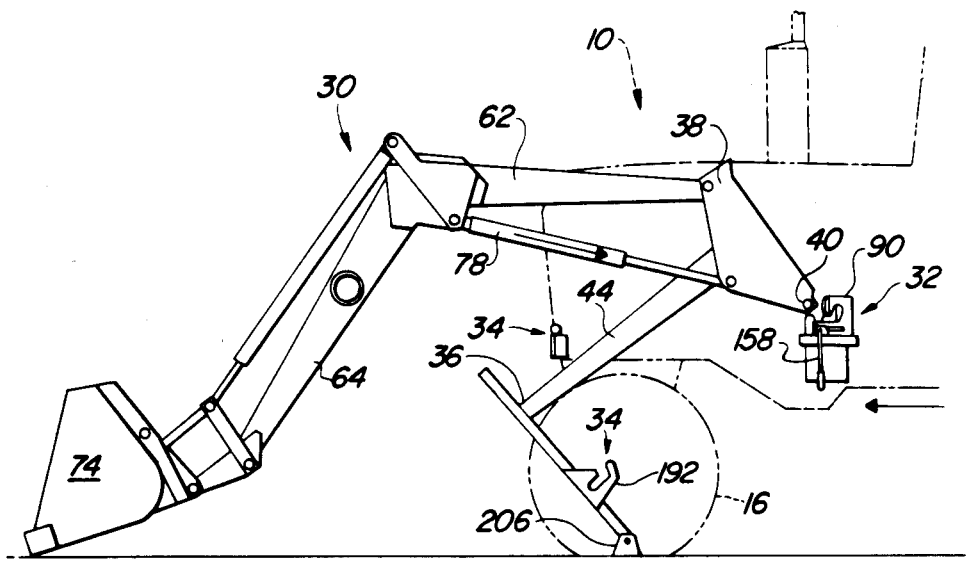
FIG. 3 is a view similar to FIG. 2 but showing the boom cylinder extended to position the mast post for engagement with the mounting brackets on the mounting frame of the tractor.

With the loader 30 in the parked position as shown in FIG. 2, the tractor 10 is driven forwardly until the forward portion of the frame 12 is located rearwardly adjacent the masts 38. The hydraulic hoses 86 are connected to the couplers on the support bracket assembly 22. The hydraulic controls in the tractor cab 24 are operated to extend the cylinder 78 and rock the loader frame upwardly about the foot members 206 until the pins 40 at the lower ends of the masts 38 are approximately level with the slotted bracket structure 90. The handles 158 are located in their downward position so that the wedge blocks 146 are in the forwardmost positions. The tractor is driven forwardly (FIG. 3) until the pins 40 are above the upwardly opening areas 122 of the slots 120. The cylinders 78 are then retracted to rock the mast posts 38 downwardly until the pins 40 bottom on the forward portions of the slots 120 (just rearwardly of the upward projections 132). At this point, the weight of the loader 30 is shifted generally from the ground to the tractor through the rear bracket structure 32. The boom cylinders then are retracted further to rotate the forward end of the loader frame upwardly (FIG. 4) about the mounting pins 40. The upward projections or ears 132 on the bracket structure 90 prevent the pins 40 from sliding forwardly out from their respective slots 120. Continued retraction of the cylinders 78 causes the forward end of the loader frame 36 to rotate upwardly about the axis of the pins 40 until the slotted bracket 192 engages the pins 186 adjacent the projecting members or ears 202 or, alternately, the crossbar pivot 59 of FIG. 13 contacts the slotted brackets 252). The tractor 10 is then driven forwardly (FIG. 5) until the pins 186 bottom in the forward end of the slots 196 (or the crossbar pivot 59 seats in the aft ends of the slots 258). At the same time the rear mounting pins 40 move rearwardly in their respective slots 120 to a position below the upwardly directed aft portions 126 of the slots 120. This movement also pushes the wedge blocks 146 and the corresponding handle arrangements 156 rearwardly in the bracket 90. Thereafter, the boom cylinders 78 are extended to rotate the mast posts 38 upwardly about the pins 186 (or the pivot 59) thereby causing the pins 40 to move upwardly into the slot portions 126. As the pins 40 reach the top of the slot portions 126, the wedge blocks 146 are biased under the corresponding pins 40 by the springs 148 to automatically secure the loader 30 on the tractor frame 12 without need for additional pins or bolts.

DISMOUNTING OF THE LOADER

To dismount the loader, the handle 158 is moved about 270 degrees in the counterclockwise direction from the normal six o'clock position as shown in FIG. 9 to a nine o'clock position. As the handle is rotated, the cams 174 force the shaft portion 162 with the wedge block 146 rearwardly to open the upper portions of the slots 126 in the downward direction. A flat on each of the cams 174 locks the wedge block in the open position upon rotation of the handle to the nine o'clock position. The cylinders 78 are retracted as necessary to force the pins 40 down the upper portions 126 of the slots to the position shown in FIG. 5. The ears 132 prevent the loader frame 36 from being dropped before the forward end of the loader frame contacts the ground. The cylinders 78 are extended to cause the slotted brackets 192 to rotate downwardly about the axes of the pins 40 until the foot members 206 contact the ground. Slight further extension of the cylinders 78 lifts the pins 40 over the ears 132 of the bracket 90. Thereafter, the operator backs the tractor 10 from the loader 30, and the cylinders 78 are then retracted until the loader reaches its final parked position as shown in FIG. 2. In the parked position, all the cylinders 78 and 82 are in their fully retracted position and relieved from pressure. The hoses 86 are then disconnected from the quick couplers at the bracket 22, and the tractor is entirely freed from the loader 30 for other operations.

Having described the preferred embodiment, it will be apparent that modifications can be made without departing from the scope of the invention as defined in the accompanying claims:

1. A method of detachably mounting an implement such as a loader to a tractor, the implement including a fore-and aft extending frame and a hydraulically operated boom pivotally connected to the frame, said method comprising the steps of:
   securing a slotted bracket to the tractor;
   providing a pin at the aft end of the frame;
   positioning the pin in the slotted bracket;
   rotating the forward end of the frame upwardly about the pin;
   securing the upwardly rotated forward end of the frame to bracket structure located at the forward end of the tractor;
   moving the pin in the slot; and
   positioning a block against the pin to secure the pin in the slot.

2. The invention as set forth in claim 1 wherein the step of moving the pin includes, after the step of securing, rotating the loader frame about the forward bracket structure.

3. The invention as set forth in claim 1 wherein the step of moving the pin in the slot includes providing an upwardly inclined slot portion and rotating the aft end of the loader frame upwardly about the forward end of the frame to move the pin into the upwardly inclined slot portion.

4. The invention as set forth in claim 3 wherein the step of positioning a block includes providing an inclined surface on the block and moving the surface under the pin after the pin is moved into the upwardly inclined slot portion.

5. The invention as set forth in claim 4 including the step of automatically adjusting for tolerances and/or wear between the pin and the slotted bracket by biasing the inclined surface against the pin.

6. The invention as set forth in claim 3 including the steps of moving the block away from the pin and forcing the pin down the inclined slot to break the loader away from the tractor.

7. The invention as set forth in claim 6 wherein the step of forcing the pin includes operating the boom to move the pin downwardly in the slot.

8. The invention as set forth in claim 6 wherein the step of moving the block comprises camming the block away from the upwardly inclined slot portion.

9. The invention as set forth in claim 6 wherein the step of forcing the pin includes rotating the aft end of the frame downwardly about the forward end of the frame.

10. A device for detachably mounting a fore-and-aft extending implement such as a loader to the frame of a tractor, said mechanism comprising:
    a bracket having an elongated slot with first and second slot portions, said second slot portion being offset at an angle to the first slot portion;
    means for connecting the bracket to the tractor frame;
    pin means connected to the implement for slidable receipt by the elongated slot; and
    means for automatically capturing the pin means as the pin means slides from the first slot portion toward the second slot portion, said means for capturing including spring biased spring wedge means for automatically reducing play between the pin means and the bracket.

11. A device for detachably mounting a fore-and-aft extending implement such as a loader to the frame of a tractor, said mechanism comprising:
    a bracket having an elongated slot with first and second slot portions;
    means for connecting the bracket to the tractor frame;
    pin means connected to the implement for slidable receipt by the elongated slot; and
    means for automatically capturing the pin means as the pin means slides from the first slot portion toward the second slot portion, said means for capturing including wedge means for reducing play between the pin means and the bracket wherein the first slot portion is substantially horizontal, the second slot portion is offset at an angle from the first slot portion, and the means for capturing includes means for biasing the wedge means toward the first slot portion to maintain the pin means in the second slot portion.

12. The invention as set forth in claim 11 wherein the second slot portion is inclined upwardly from the first portion.

13. The invention as set forth in claim 11 wherein the first slot portion has a vertically directed open portion for receiving the pin and the first slot portion angles slightly upwardly toward the second slot portion to facilitate sliding of the pin toward the open portion during detachment of the implement.

14. The invention as set forth in claim 11 wherein the second slot portion is angled upwardly from the first slot portion, and means for urging the means for apturing away from the pin means when the pin means is in the captured position to permit the pin means to move downwardly toward the first slot portion.

15. The invention as set forth in claim 14 wherein the second slot portion has at least a slight fore-and-aft component to thereby cause relative fore-and-aft movement between the tractor and implement as the pin means moves down the slot to thereby help the implement to break loose from the tractor.

16. The invention as set forth in claim 14 wherein the means for urging comprises a handle pivotally connected to the means for capturing, and cam means for moving the means for capturing as the handle is rotated.

17. A device for detachably mounting a fore-and-aft extending implement such as a loader to the frame of a tractor, said mechanism comprising:
    a bracket having an elongated slot with first and second slot portions;
    means for connecting the bracket to the tractor frame;
    pin means connected to the implement for slidable receipt by the elongated slot; and
    means for automatically capturing the pin means as the pin means slides from the first slot portion toward the second slot portion, said means for capturing including wedge means for reducing play between the pin means and the bracket and spring means yieldingly biasing the wedge means against the pin means when the latter is in the second slot portion for maintaining a relatively tight fit between the pin means and second slot portion and to automatically compensate for wear in the bracket, pin means and wedge means.

18. In a loader adapted for mounting on and dismounting from a tractor having a fore-and-aft extending tractor frame, the loader including a mast having transversely spaced fore-and-aft extending mast beams, upright beams fixed to the aft ends of the respective mast beams, and a forward frame member connecting the forward ends of the mast beams, a boom pivotally connected to the upright beams and extending forwardly therefrom to a ground-engaging tool such as a loader bucket, and cylinder means for pivoting the boom with respect to the upright beams, attaching structure for connecting the loader to the tractor, comprising:

a pair of brackets connected to the sides of the tractor frame, the brackets each including an elongated slot with a pocket located at one end of and offset from the slot, said upright beams including pin means adapted for receipt by the respective slots for pivotally connecting the mast to the tractor frame, said pin means movable along the slots, means for rotating the mast to move the pin means from the slots and into said pockets, said brackets further comprising spring wedge means for automatically securing the pin means in the respective brackets as the pin means move into the pockets, and means for securing the forward end of the mast to the tractor frame to thereby restrict rocking of the mast with respect to the tractor frame.

19. The invention as set forth in claim 18 wherein the means securing the forward end includes front mounting structure connected to the forward end of the tractor and to the forward end of the mast for securing the forward end of the mast to the tractor as the pin means move into the pockets of the brackets.

20. In a loader adapted for mounting on and dismounting from a tractor having a fore-and-aft extending tractor frame, the loader including a mast having transversely spaced fore-and-aft extending mast beams, upright beams fixed to the aft ends of the respective mast beams, and a forward frame member connecting the forward ends of the mast beams, a boom pivotally connected to the upright beams and extending forwardly therefrom to a ground-engaging tool such as a loader bucket, and cylinder means for pivoting the boom with respect to the upright beams, attaching structure for connecting the loader to the tractor, comprising:

a pair of brackets connected to the sides of the tractor frame, the brackets each including an elongated slot with a pocket located at one end of the slot, said upright beams including pin means adapted for receipt by the respective slots for pivotally connecting the mast to the tractor frame, said pin means movable along the slots and into said pockets, said brackets further comprising wedge means for automatically securing the pin means in the respective brackets as the pin means move into the pockets, and means for securing the forward end of the mast to the tractor frame to thereby restrict rocking of the mast with respect to the tractor frame, wherein the means securing the forward end includes front mounting structure connected to the forward end of the tractor and to the forward end of the mast for securing the forward end of the mast to the tractor as the pin means move into the pockets of the brackets, wherein the bracket slots are horizontally disposed and the front mounting structure includes horizontally slotted portions and mating pin structure, so that upon relative fore-and-aft movement between the mast and the tractor frame, the mating pin structure moves along the slotted portions and the pin means move along the bracket slots.

21. The invention as set forth in claim 20 wherein the pockets are offset vertically from the bracket slots, and means for rotating the mast generally about the front pin structure to move the pin means into the pockets.

22. The invention as set forth in claim 21 wherein the pockets are offset above the slots, and the wedge means each include a sliding block movable from an unlatched position offset from the pocket, and a latched position under the pocket for restricting movement of the pin means from the pocket into the slot.

23. The invention as set forth in claim 22 including lever means for securing the sliding block in the unlatched position to facilitate removal of the loader from the tractor.

24. In a loader adapted for mounting on and dismounting from a tractor having a fore-and-aft extending tractor frame, the loader including a mast having transversely spaced fore-and-aft extending mast beams, upright beams fixed to the aft ends of the respective mast beams, and a forward frame member connecting the forward ends of the mast beams, a boom pivotally connected to the upright beams and extending forwardly therefrom to a ground-engaging tool such as a loader bucket, and cylinder means including a cylinder connected between the upright beams and the boom for pivoting the boom with respect to the upright beams, attaching structure for operably connecting the loader to the tractor, comprising:

at least one hydraulic base having an output end, means connecting the output end to the cylinder forwardly of the pivotal connection of the boom with the upright beams, said hose also including a bent portion curving downwardly and forwardly adjacent said pivotal connection of the boom to a central portion extending forwardly adjacent one of the mast beams and an input end adapted for connection to connecting structure located at the forward end of the tractor for communication of hydraulic fluid under pressure to the cylinder, a bracket connected to the hose generally between the bent and central portions of the hose; and means pivotally connecting the bracket to the mast adjacent the aft end of said one of the mast beams for supporting the hose and permitting the hose to flex with pivoting of the boom and with fore-and-aft movement of the tractor with respect to the mast during mounting and dismounting of the loader.

25. The invention as set forth in claim 24 wherein the input end of the hose is curved forwardly toward the connecting structure on the tractor, said means pivotally connecting the bracket permitting substantial movement between the tractor and the mast during mounting and dismounting.

26. The invention as set forth in claim 24 wherein the bracket is rotatable approximately 180 degrees during dismounting of the loader to permit the tractor to be moved in the fore-and-aft direction clear of the mast prior to disconnecting the hose from the connecting structure.

27. The invention as set forth in claim 24 wherein the means pivotally connecting comprises a pivot pin connected to said one of the mast beams and having a transversely extending pivotal axis.

28. The invention as set forth in claim 24 wherein the connecting structure on the tractor includes a forwardly projecting hose connector and the input end of the hose, when the loader is mounted on the tractor, extends forwardly of the connecting structure and the hose includes a bend location between the input end and the central portion so that upon movement of the tractor rearwardly from the loader, the bend location straightens to increase the distance the tractor may be backed away from the loader with the input end still connected.

29. In a loader adapted for mounting on and dismounting from a tractor having a fore-and-aft extending tractor frame, the loader including a mast having transversely spaced fore-an-aft extending mast beams, upright beams fixed to the aft ends of the respective mast beams, and a forward frame member connecting the forward ends of the mast beams a boom pivotally connected to the upright beams and extending forwardly therefrom to a ground-engaging tool such as a loader bucket, and cylinder means including a cylinder connected between the upright beams and the boom for pivoting the boom with respect to the upright beams, attaching structure for operably connecting the loader to the tractor, comprising:

at least one hydraulic hose having an output end, means connecting the output end to the cylinder forwardly of the pivotal connection of the boom with upright beam, said hose also including a bent portion curving downwardly and forwardly adjacent said pivotal connection of the boom to a central portion extending forwardly adjacent one of the mast beams, and an input end adapted for connection to connecting structure located at the forward end of the tractor for communication of hydraulic fluid under pressure to the cylinder, a bracket connected to the hose generally between the bent and central portions of the hose and a pivot rockably connecting the bracket to the mast for movement between a first position wherein the central portion extends forwardly from the pivot and a second position wherein the central portion extends rearwardly from the pivot; and wherein the connecting structure on the tractor includes a forwardly projecting hose connector and the input end of the hose, when the loader is mounted on the tractor, extends forwardly of the connecting structure and the hose includes a bend location between the input end and the central portion so that upon movement of the tractor rearwardly from the loader, the bracket rocks toward the second position and the bend location straightens to increase the distance the tractor may be backed away from the loader with the input end still connected.

* * * * *

UNITED STATES PATENT AND TRADEMARK OFFICE
CERTIFICATE OF CORRECTION

PATENT NO. : 4,798,511

DATED : 17 January 1989

INVENTOR(S) : Edward Ted Kaczmarczyk et al

It is certified that error appears in the above-identified patent and that said Letters Patent is hereby corrected as shown below:

Column 12, claim 10, line 4, after "biased" delete "spring"; claim 14, lines 38 and 39, change "apturing" to -- capturing --.

Column 13, claim 18, line 25, after "spring" insert -- biased --.

Column 14, claim 24, line 35, change "base" to -- hose --.

Column 15, claim 29, line 17, change "fore-an-aft" to -- fore-and-aft --; and line 20, after "beams" insert a comma -- , --.

Signed and Sealed this

Thirty-first Day of October, 1989

*Attest:*

DONALD J. QUIGG

*Attesting Officer*     *Commissioner of Patents and Trademarks*